June 5, 1962 J. O. FORD 3,037,583
CRANK SHAFT OILING DEVICE
Filed Feb. 1, 1961 2 Sheets-Sheet 1
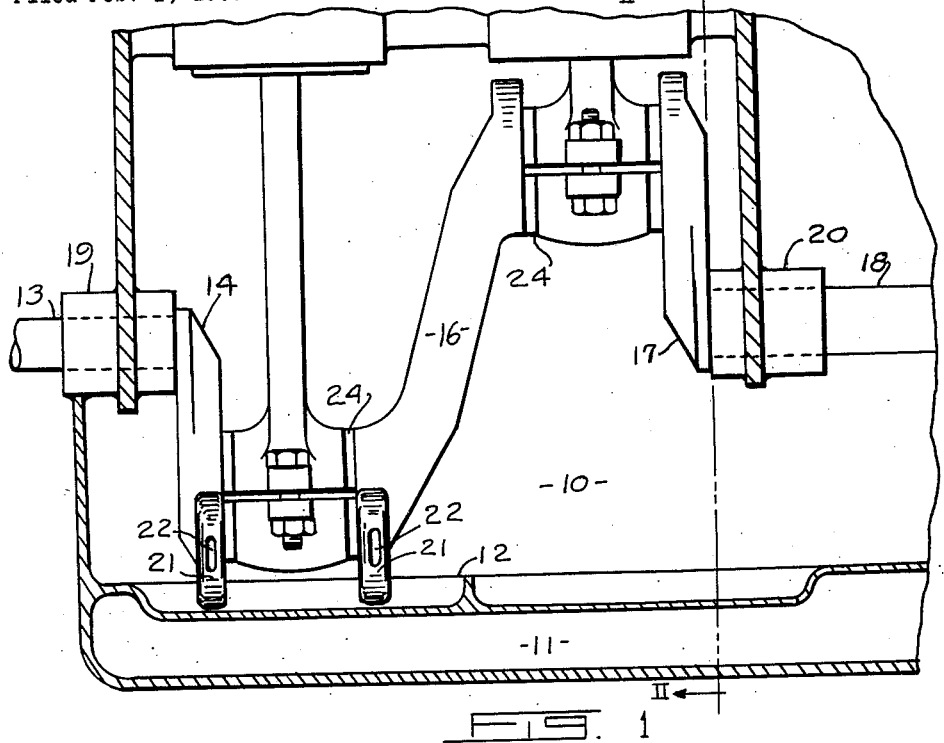
FIG. 1
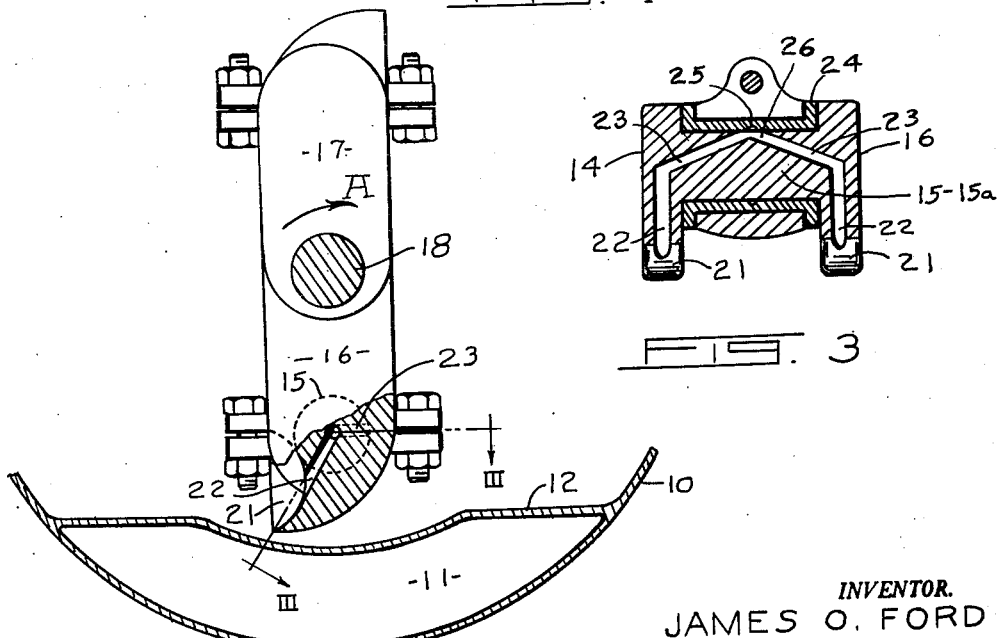
FIG. 2
FIG. 3
INVENTOR.
JAMES O. FORD
BY M. Y. Charles
ATTORNEY.

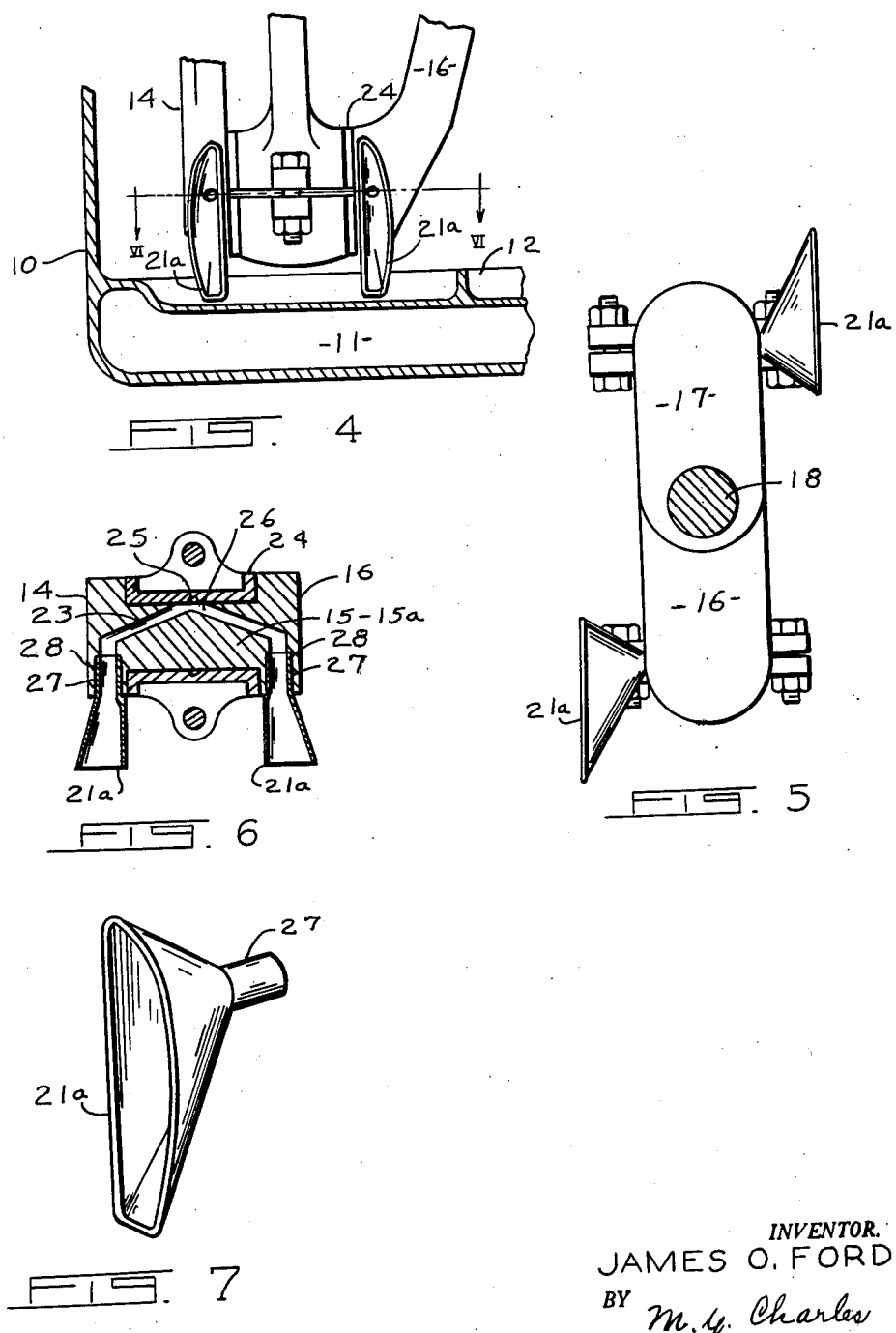

ically as a part of the cup, which nipple 27 fits into a recess 28 drilled into the crank shaft and at the location where the cup 21 is located on the preferred form as shown in FIGS. 1, 2 and 3. In this modified form the oil passage 22a is drilled through the nipple 27 and the passage 23 is drilled in the crank pins 15 and 15a in the same manner as above described. The nipple 27 is held in place by a set screw 29 which is screwed into the crank 14, 16 or 17 at right angles to the nipple 27. Otherwise the device shown in FIGS. 4, 5, 6 and 7 is the same as the device shown in FIGS. 1, 2 and 3.

3,037,583

CRANK SHAFT OILING DEVICE
James O. Ford, 712 Pennsylvania Ave., Garden City, Kans.
Filed Feb. 1, 1961, Ser. No. 86,415
2 Claims. (Cl. 184—11)

My invention relates in general to new and useful improvements in internal combustion engines, and more specifically to an improved crankshaft oiling system.

Because of the coat factor, on certain types of internal combustion engines, there are no pressure lubricating systems. On these types of internal combustion engines, the connecting rod bearings are lubricated only by the passage of the connecting rods and their respective crankshaft throws through the oil supply in the crankcase of the engine. In many instances this has proved totally unsatisfactory with the result that the bearings are burned out due to improper lubrication. In as much as the replacement of bearings is an expensive item, it is highly desirable that this situation be overcome.

It is therefore the primary object of this invention to provide a pressure oiling system for connecting rod bearings of a crankshaft, which pressure oil system is readily adaptable to existing types of engines and which may be provided at a minimum of cost.

Another object of this invention is to provide a crankshaft oiling system which includes oil passages formed in the throws of a crankshaft and extending through the journals of such throws, there being positioned in the oil passages and projecting externally of the throws, small funnel-shaped scoops, which scoops are so positioned, whereby they move in advance of the throws through the oil in a crankcase and thus channel oil to the connecting rod bearings.

Still another object of this invention is to provide an improved crankshaft oiling system, the crankshaft oiling system being extremely simple and being of such a nature whereby crankshafts of existing engines may be readily converted to utilize such an oiling system, the oiling system requiring only a slight modification of the crankshaft which may be readily accomplished in any machine shop.

A further object of this invention is to provide an improved oiling system for connecting rod bearings of a crankshaft, the oiling system being in the form of funnel-shaped scoops carried by the crankshaft so as to move in advance of the crankshaft through the oil supply in the crankcase of the internal combustion engine and there being provided oil passages extending between the scoops and connecting rod bearings of the crankshaft, whereby the oil is supplied under pressure to the connecting rod bearings.

A still further object of the invention is to provide an oiling system of the kind mentioned in which the oil cups and passages therefrom may be made as in integral part of the crankshaft at the time of manufacture of the crankshaft instead of being an added feature to the crankshaft after the crankshaft has been made as above suggested.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a sectional view through a crankcase of an internal combustion engine and showing a side view of a crankshaft therein in which the above mentioned invention is included.

FIG. 2 is a detail sectional view through the parts shown in FIG. 1 the view being as seen from the line II—II in FIG. 1 and looking in the direction of the arrows.

FIG. 3 is a detail sectional view through a connecting rod bearing cap and also a portion of the associated crankshaft crank pin to illustrate the oil passages provided in the device, the view being as seen from the line III—III in FIG. 2 and looking in the direction of the arrows.

FIG. 4 is a detail sectional view similar to FIG. 1 and showing a modified form of the invention.

FIG. 5 is a sectional view similar to FIG. 2 but showing the device as an outfit separate from, but attachable to the crankshaft instead of being an integral part of the crankshaft as shown in FIG. 2.

FIG. 6 is a sectional view similar to FIG. 3, but showing the device as illustrated in FIGS. 4 and 5, the view being as seen from the line VI—VI in FIG. 4 and looking in the direction of the arrows.

FIG. 7 is a perspective view of one of the oiler cops employed in the device shown in FIGS. 4, 5 and 6.

In the drawings is shown a conventional crankcase 10 having an oil reservoir space 11 therein, above which is positioned the usual oil dip pan 12.

Above the dip pan 12 is the usual crank shaft having the main journal portion 13 to which one end of a crank arm 14 is integrally attached thereto and the arm 14 depends downward therefrom. One end of a crank pin 15 is integrally attached to the lower end of the crank 14, and is positioned in parallelism with the journal 13; the other end of the crank pin 15 is integrally joined to the lower end of a cantilever crank 16 which extends upwardly across the center axis of the main journal 13 and one end of a second crank pin 15a is integrally joined to the upper end of the cantilever 16 and extends outwardly therefrom in parallelism with the main journal 13 to a point where it integrally joins the upper end of a third crank element 17, which extends downwardly and integrally connects with a second main journal 18 which is in axial alignment with the first main journal 13. This forms the conventional crank shaft which may consist of one or more such sections as that just described and which is carried on the main journals, such as 13 and 18 that are revolvably mounted in bearings 19 and 20 so that the outer ends of the cranks 14, 16 and 17, as they are revolved around the center axis of the main journals 13, and 18, will dip into the dip pan 12 to pick up oil that may be therein as will later be described.

The preferred form of the invention as shown in FIGS. 1, 2 and 3 consists of a dip cup 21 formed as a part of the original forging of the crankshaft, and is located on the extreme outer advancing edge of the cranks 14, 16 and 17, as the crankshaft revolves in the running of the engine and so that the cups 21 dip well into the oil in the dip pan 12.

After the dip cup 21 has been formed on its respective crank 14, 16 and 17, an oil passage 22 is drilled from the bottom of the cup 21, substantially to the center axis of its respective crank pin such as 15 or 15a, whereby a second oil passage 23 is drilled from the back or trailing side of the crank pin 15 or 15a, and substantially from the central portion thereof diagonally lengthways through the crank pin 15 or 15a to join with the first said oil passage 22.

This having been done the crank pin 15, 15a is ready to receive the connecting rod bearing inserts 24, which have been prepared for use on the crank pins 15 or 15a by having an annular recess 25 therein which, when the insert is placed on the crank pin 15, 15a will register with the oil passage 26 of the oil passage 23, so that a flow of oil may circle the crank pin 15, 15a and spread sideways around the face of the crank pin for an abundant lubrication of the connecting rod bearing as the engine runs.

The device as above described is probably as the device would be made at the time of manufacture of the crankshaft, however, if desired the device could be made as an accessory and as shown in FIGS. 4, 5, 6 and 7.

The dip cup 21a would be made as a separate piece from the crank shaft and would have a hollow nipple 27 thereon that would be receivable in an enlarged oil passage 28 after which the cup would be (preferably) braised to the crank to insure its permanent attachment thereto, otherwise the oil passages would be drilled as previously described and the bearing inserts would be prepared as above described and the device would be ready for use.

The operation of the device is as follows: The crankcase would be provided with oil in the usual manner, whereupon the engine would be started, whereupon the crankshaft would turn in the direction of the arrow A, and because of the speed with which the crank shaft would turn, the dip cups 21 and 21a would dip with force into the oil in the dip tray 12 which would force the oil to fill the cup 21 or 21a and flow with force through the oil passages 22 and 23 and discharged into the bearing insert depression 25 and because of the pressure being exerted there would spread onto the crank pin surface on either side of the depression 25 and thoroughly lubricate the bearing.

This process of lubrication would continue with full efficiency so long as there is any oil left in the crankcase and dip pan.

Now while the device as shown and described is probably the preferred form of the device, that such modifications of the device may be employed as lie within the scope of the appended claims without departing from the spirit and intention of the invention.

Now having fully described my invention, what I claim is:

1. A crankshaft oiling device; said crankshaft having spaced apart crank arms; said crank shaft also having crank pin means positioned, one between successive pairs of crank arms and the ends of said crank pins being integrally joined to their respective crank arm at the outer end portion thereof; said oiling system comprising an oil dip cup carried on the outer end portion and leading edge of each crank arm relative to the direction of rotation of the crank shaft; each said crank pin having two oil passages therein, said oil passages extending from the rear and central point of their respective crank pin diagonally one through each half of the crank pin, and into their crank arms at a point near their respective oil dip cup, and each crank arm having oil passage means therein connecting between the bottom of the oil dip cup and the end of the oil passage means in the crank means and crank arm immediately adjacent thereto; the oil passages in the said crank pins being positioned at an angle obtuse to their respective oil passages in the crank arm.

2. A crank shaft oiling device, as defined in claim 1 in combination with the foregoing defined structure; bearings, one for and positioned around each crank pin, each of said bearings having an annular groove therein; said groove being in registry with the junction point of the inner ends of the two crank pin oil passages so as to receive oil therefrom and distribute the oil around the entire external face of its respective crank pin.

References Cited in the file of this patent

UNITED STATES PATENTS

| | | |
|---|---|---|
| 1,295,091 | Isliker | Feb. 18, 1919 |
| 1,348,664 | Richard | Aug. 3, 1920 |
| 1,506,553 | Baldwin | Aug. 26, 1924 |
| 1,936,101 | Baits | Nov. 21, 1933 |